(No Model.)

H. V. APPLEY.
THILL BOLT.

No. 471,502. Patented Mar. 22, 1892.

Witnesses:
George H. White
E. McWhinney

Inventor:
Harrison V. Appley
By Ithiel J. Billey
Attorney.

UNITED STATES PATENT OFFICE.

HARRISON V. APPLEY, OF GRAND RAPIDS, MICHIGAN.

THILL-BOLT.

SPECIFICATION forming part of Letters Patent No. 471,502, dated March 22, 1892.

Application filed June 25, 1891. Serial No. 397,525. (No model.)

*To all whom it may concern:*

Be it known that I, HARRISON V. APPLEY, a citizen of the United States, residing at Grand Rapids, in the county of Kent and State of Michigan, have invented a new and useful Improvement in Bolts, of which the following is a specification.

My invention relates to improvements in bolts designed particularly for use for connecting thills to vehicles; and its objects are, first, to provide a bolt that will render the thill connection anti-rattling; second, to provide a thill-connecting bolt upon which the nut cannot work loose, and, third, to provide a bolt that cannot work out of its bearing when the nut is removed. I attain these results by the mechanism illustrated in the accompanying drawings, in which—

Figure 1:
Figure 3:
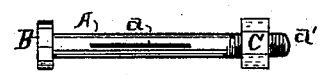
Figure 2:
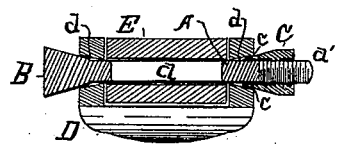
Figure 4:
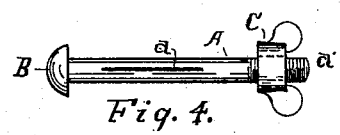
Figure 5:
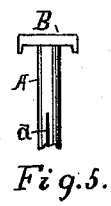
Figure 6:
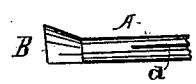

Figure 1 is a plan of the bolt. Fig. 2 is a section of the same on the line $x\,x$ of Fig. 1; and Figs. 3, 4, 5, and 6 are modified forms of heads and nuts.

Similar letters refer to similar parts throughout the several views.

I construct the body A of the bolt of steel and make a slot $a$ through it, so that the sides of the bolt may be spread to form a curve or bulge in the bolt where it enters the thill-clip E and temper the curved sides to a spring-temper, so that they may be made to fill the clip snugly, and as they wear will spring out, so that they will always fit snugly in the clip.

The head and nut may be made in any form, as indicated in Figs. 3, 4, 5, and 6; but I prefer that the head be made tapering and polygonal upon its surface, as shown at B, Fig. 1, and that the end of the nut that bears upon the ear of the clip D be made tapering, so that when the nut is forced solidly against the clip the point will enter the bolt-hole $d$ in one ear, and the head B will be drawn into the hole in the other ear, and both will be drawn in so snugly that there can be no trembling or rattling of the bolt in the ears of the clip, and the corners of the polygonal head will be embedded into the ear of the clip, so that the bolt cannot be turned by the action of the thill-clip upon the center of the bolt. The nut is squared at $c'$ for the use of a wrench. By this means I am not only enabled to produce an anti-rattling bolt and a perfect nut-lock that can be adjusted at pleasure, but to produce a bolt that cannot under any circumstances work out of the clips should the nut be removed.

While I design this bolt especially for an anti-rattling thill-coupling bolt, I do not restrict it to this particular use, as there are many other uses for which it is equally valuable.

For the purpose of protecting the thread of the bolt from contact with the ears of the clip, and at the same time insuring a sufficient length of thread to permit of taking up the wear of the clip upon the head and nut, I form a chamber $c$ in the inner end of the nut, that fits closely upon the bolt, there being no thread in this chamber, so that the thread $a'$ upon the end of the bolt need not be cut nearly to the line of bearing of the clip-ear.

Having thus fully described my invention, what I claim as new, and desire to secure by Letters Patent, is—

1. As a new and useful article of manufacture, a bolt provided at one end with a polygonal tapering head, at the other end with a screw-thread, the body formed of spring metal and provided with a longitudinal slot from a short distance back of the screw-thread to within a short distance of the head, and spread at the center to form spring-bearings to fit snugly in the material through which it passes, and a tapering nut chambered at the small end, substantially as specified.

2. As a new and useful article of manufacture, a bolt made of spring metal, the body of said bolt having a longitudinal slot extending from near the head to within a short distance of the screw-thread, said slot being spread at the center to form a rigid spring bearing in the material through which it passes, substantially as specified.

Signed at Grand Rapids, Michigan, this 22d day of June, A D. 1891.

H. V. APPLEY.

In presence of—
ITHIEL J. CILLEY,
E. McWHINNEY.